US007736026B2

(12) United States Patent  (10) Patent No.: US 7,736,026 B2
Teichgraeber et al.  (45) Date of Patent: Jun. 15, 2010

(54) LAMP REFLECTOR COOLING AIR DEFLECTOR

(75) Inventors: Bryan R. Teichgraeber, Frisco, TX (US); Frank J. Poradish, Plano, TX (US); Scott Patrick Overmann, Plano, TX (US); Steven P. Krycho, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 11 days.

(21) Appl. No.: 10/186,851

(22) Filed: Jul. 1, 2002

(65) Prior Publication Data

US 2003/0021120 A1 Jan. 30, 2003

Related U.S. Application Data

(60) Provisional application No. 60/302,317, filed on Jun. 30, 2001.

(51) Int. Cl.
F21V 11/00 (2006.01)
(52) U.S. Cl. .................. 362/294; 362/345; 362/373
(58) Field of Classification Search ................ 362/294, 362/345, 373, 547, 268, 217, 548
See application file for complete search history.

(56) References Cited

U.S. PATENT DOCUMENTS

| 3,486,019 | A | * | 12/1969 | Bryant et al. | 362/548 |
| 4,931,912 | A | * | 6/1990 | Kawakami et al. | 362/547 |
| 5,207,505 | A | * | 5/1993 | Naraki et al. | 362/373 |
| 5,947,592 | A | * | 9/1999 | Barlow | 362/345 |
| 6,042,253 | A | * | 3/2000 | Fant et al. | 362/494 |
| 6,132,061 | A | * | 10/2000 | Andrus et al. | 362/217 |
| 6,203,173 | B1 | * | 3/2001 | Duff et al. | 362/268 |
| 6,227,686 | B1 | * | 5/2001 | Takahashi et al. | 362/345 |
| 6,497,507 | B1 | * | 12/2002 | Weber | 362/547 |
| 6,578,991 | B2 | * | 6/2003 | Beaumont | 362/345 |
| 6,746,325 | B2 | * | 6/2004 | Crane | 454/342 |
| 2001/0022727 | A1 | * | 9/2001 | Beaumont | 362/345 |

* cited by examiner

Primary Examiner—Anabel M Ton
(74) Attorney, Agent, or Firm—Charles A. Brill; Wade James Brady, III; Frederick J. Telecky, Jr.

(57) ABSTRACT

To improve the cooling efficiency and ensure uniform cooling of all portions of the inside back surface of the reflector, a deflector (108) has been developed. The air deflector (108) typically encircles the lamp (102) allowing air (110) to flow between the deflector (108) and the lamp (102). This air (110) cools the lamp (102). Air (112) passing between the deflector (108) and the reflector (100) is deflected outward to cool the inside surface of the reflector near the lamp (102). Because the deflector (108) is small and is located directly behind the lamp (102), it does not block any of the useful light generated by the lamp (102). The light striking the deflector (108) from the lamp (102), if not for the deflector (108), would have passed through the opening in the reflector (100) and would have been lost. The deflector (108) typically has a number of vanes around the perimeter of a cylindrical body portion. The vanes are bent outward at an angle sufficient to force part of the cooling air to flow across the inside back surface of the reflector.

7 Claims, 4 Drawing Sheets

LAMP REFLECTOR COOLING AIR DEFLECTOR

This application claims priority of U.S. patent application Ser. No. 60/302,317 filed 30 Jun. 2001.

FIELD OF THE INVENTION

This invention relates to the field of display systems, more particularly to cinema display systems, more particularly to cooling systems used to cool lamp reflectors in cinema display systems.

BACKGROUND OF THE INVENTION

The recent introduction of all-digital cinematic display systems has presented a variety of challenges. One such challenge is the replacement of traditional film projectors with the new digital projectors while minimizing the costs involved in the change from traditional film projectors to digital projectors. To minimize initial costs, it is important for the digital projector to be able to use an existing projection booth. Additionally, modern digital projectors must make use of as much of the same equipment currently found in most cinema projection booths as possible. Among the equipment shared by both the film-based and all digital projectors is the lamp console.

Although the digital projectors are able to utilize traditional lamp consoles, the digital projectors typically require a unique reflector. The f-number of the reflectors used by the digital projectors is lower, for example f/1.5, than used by the film projectors. Additionally, the reflector is deeper. The arc lamp is also positioned closer to the back of the reflector in digital projectors than in film-based projectors. Positioning the arc lamp closer to the back of the reflector heats the inside of the back of the reflector much more than the shallower reflectors of traditional film projectors.

The new reflector design has been difficult to cool sufficiently. Without proper cooling of the back of the reflector, the reflector degrades over time and must be replaced, often after only a few months. What is needed is a method and system to properly cool the lamp and reflector in order to extend the useful life of the lamp and reflector in the digital cinema projectors.

SUMMARY OF THE INVENTION

Objects and advantages will be obvious, and will in part appear hereinafter and will be accomplished by the present invention which provides a method and system for cooling the lamp and lamp reflector in a cinema projector. One embodiment of the claimed invention provides a method of cooling a lamp reflector. The method comprising: providing a lamp reflector; providing a lamp bulb in the lamp reflector, the bulb extending through a hole in a center of the reflector; and providing an air deflector between the lamp reflector and the lamp bulb. The air deflector allows a portion of air entering the hole to cool the lamp bulb, and deflects another portion of the air entering the hole to cool an inner surface of the reflector.

According to another embodiment of the invention a lamp reflector assembly is provided. The lamp reflector assembly comprises: a lamp reflector; a lamp bulb in the lamp reflector, the bulb extending through a hole in a center of the reflector; and an air deflector between the lamp reflector and the lamp bulb. The air deflector allows a portion of air entering the hole to cool the lamp bulb, and deflects another portion of air entering the hole to cool an inner surface of the reflector.

Yet another embodiment of the present invention provides an air deflector for use in cooling lamp reflectors. The air deflector comprising: a central cylindrical body portion, an opening in the central cylindrical body portion providing clearance for air to pass through the body and around a lamp extending through the body; and at least one vane portion extending from one end of the body portion, the vane portion operable to deflect a portion of air entering the hole to cool an inner surface of the reflector.

Spring clips are generally used to hold the air deflector in the central portion of the reflector, spaced apart from the lamp. In this manner, a small deflector is used to separate the cooling airflow entering the reflector into a portion cooling the lamp and a portion cooling the inside surface of the reflector.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
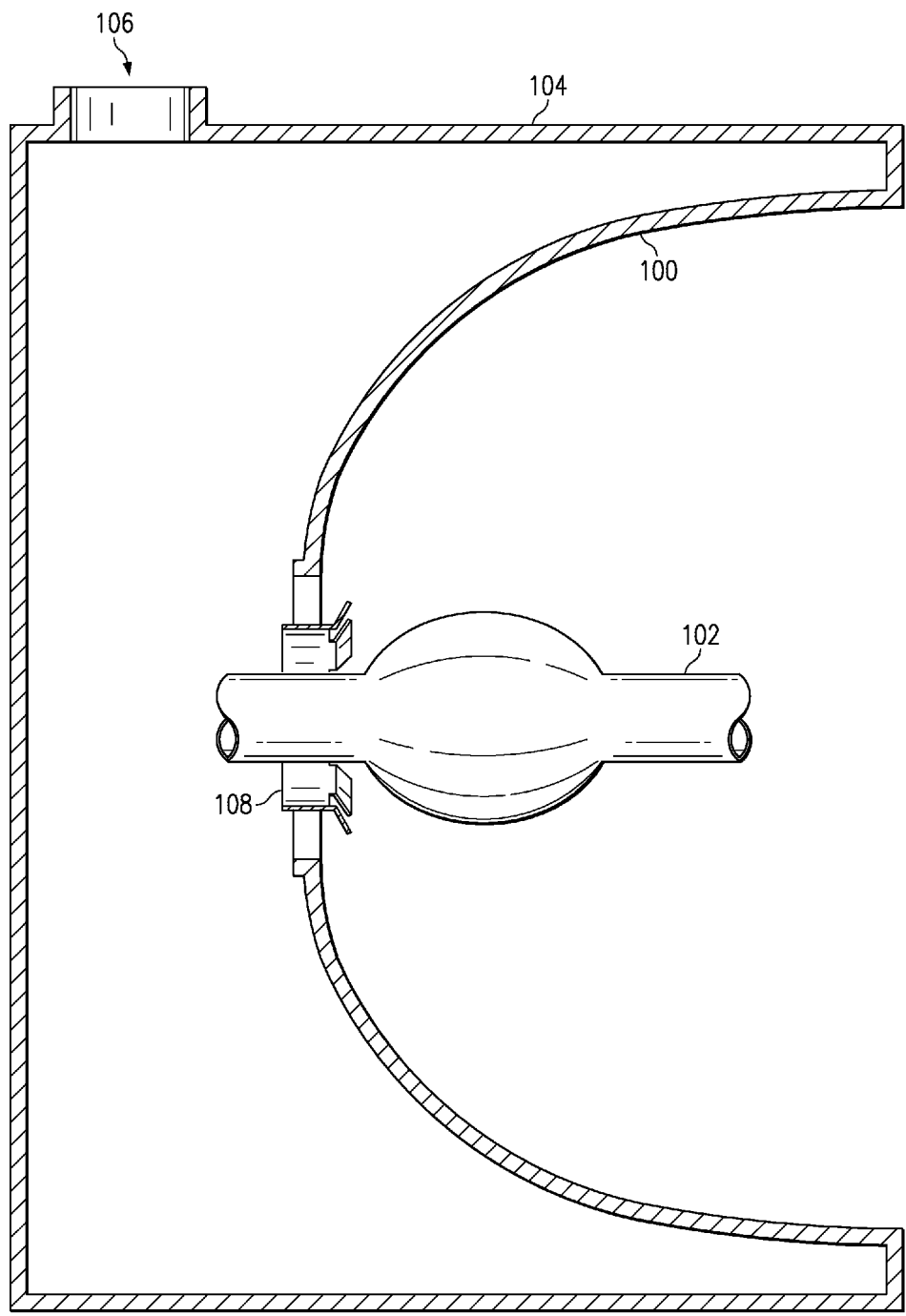
FIG. 1 is a cross section side view of a lamp reflector and plenum showing the new air deflector used to direct cooling air from the plenum on the back side of the reflector to the inner surface of the reflector and the lamp.

FIG. 1 is a cross section side view of a lamp reflector 100 similar to those traditionally used by cinema film projectors. A light source 102 is located at one focal point of the reflector 100. A plenum 104 encloses the back of the reflector 100. The reflector typically is 0.040 inch thick nickel. The inside of the reflector is mirrored to reflect and focus the light. The plenum 104 provides pressurized air to the back surface of the reflector 100 to cool the reflector 100.

Traditional reflectors are warranted to withstand temperatures up to 2502º C. The larger reflectors used by digital projectors, however, position the arc lamp much closer to the back of the reflector. This raises the temperature as high as 300° C. The higher temperature eventually deforms the reflector, reducing the ability of the reflector to properly focus light. The higher temperature also degrades the inner mirrored surface of the reflector. As a result, the light available for projection is reduced from 12,000 lumens to 7,000 lumens in a matter of a few months and the reflector must be replaced.

The air input forced into the plenum 104 along path 106 is forced out an opening around the lamp 102 in the center of the reflector 100. This air cools the lamp, preventing degradation of the lamp glass. The air flow, however, does not provide efficient or uniform cooling of the back portion of the reflector nearest the lamp arc. To improve the cooling efficiency and ensure uniform cooling of all portions of the back of the reflector, a deflector 108 has been developed.

Figure 2:
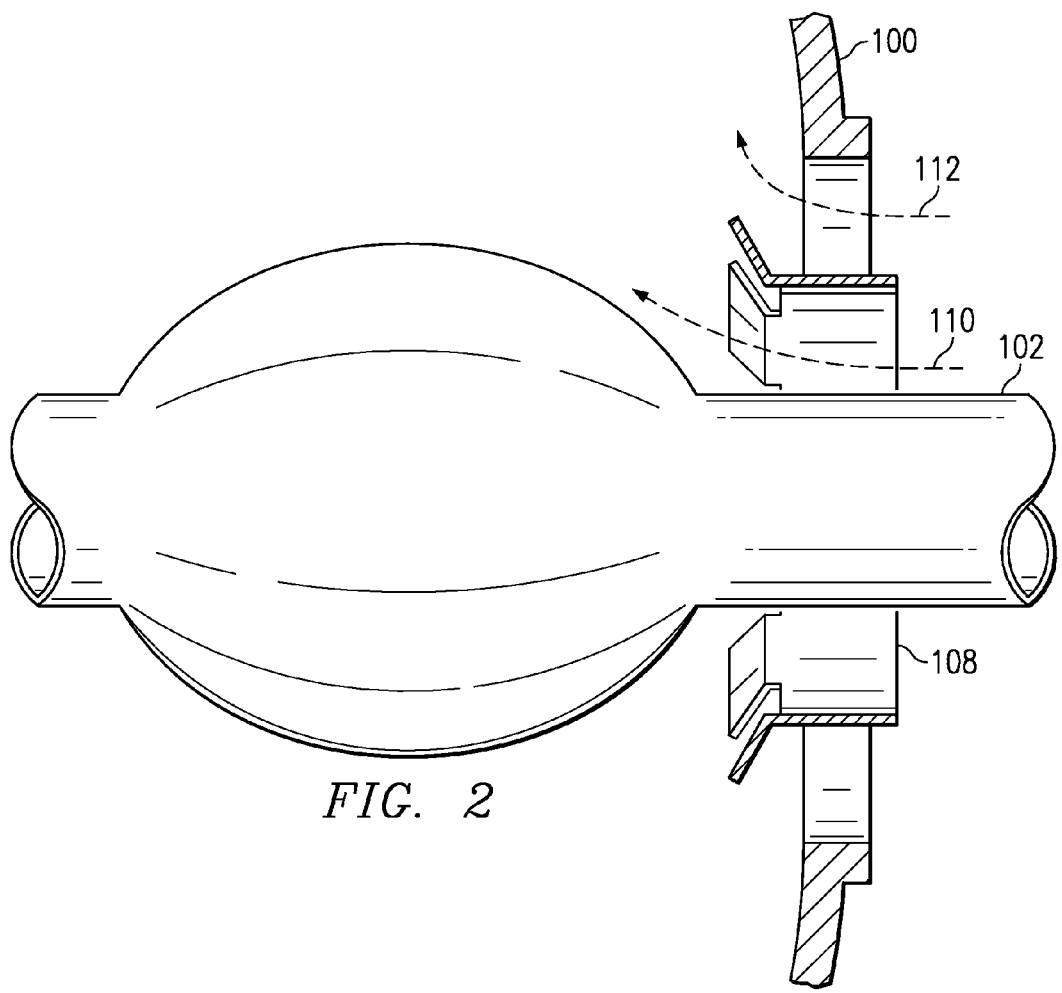
FIG. 2 is a cross section side view of a portion of the lamp reflector of FIG. 1 showing the operation of the new air deflector.

As shown in FIG. 2, the air deflector 108 typically encircles the lamp 102 allowing air 110 to flow between the deflector 108 and the lamp 102. This air 110 cools the lamp 102. Air 112 passing between the deflector 108 and the reflector 100 is deflected outward to cool the inside surface of the reflector near the lamp 102. Because the deflector 108 is small and is located directly behind the lamp 102, it does not block any of the useful light generated by the lamp 102. The light striking the deflector 108 from the lamp 102, if not for the deflector 108, would have passed through the opening in the reflector 100 and would have been lost.

Figure 3:
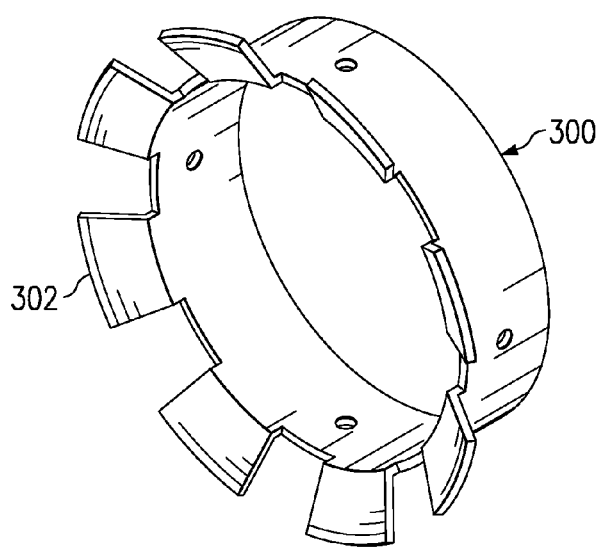
FIG. 3 is a perspective view of the air deflector according to one embodiment of the present invention.
Figure 4:
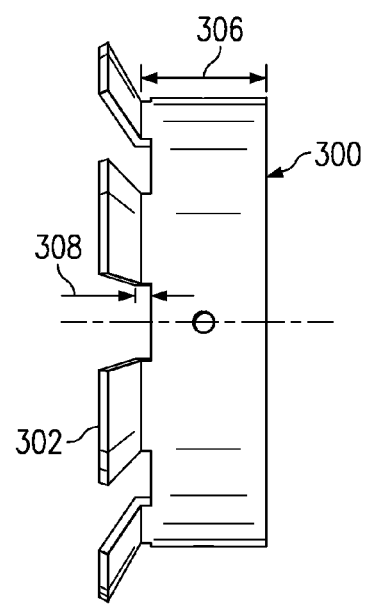
FIG. 4 is a side view of the air deflector of FIG. 3 showing one arrangement of deflector fins.
Figure 5:
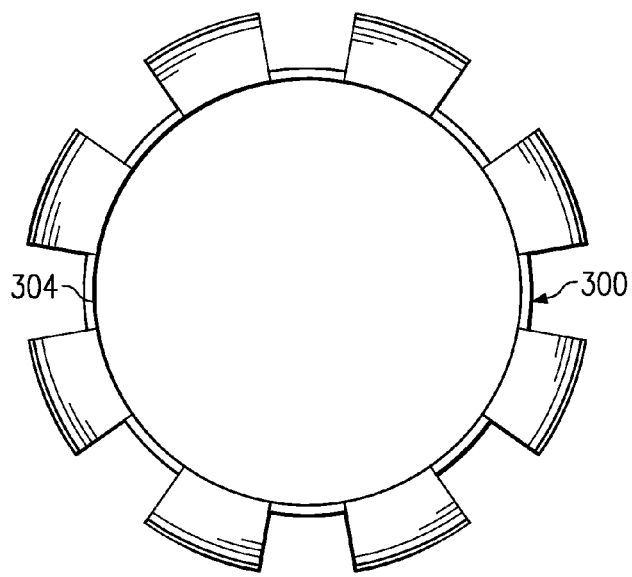
FIG. 5 is a front view of the air deflector of FIG. 3 showing one arrangement of deflector fins.

FIG. 3 is a perspective view of the air deflector according to one embodiment of the present invention. The same air deflector is shown in side view by FIG. 4 and in front view by FIG. 5. For purposes of illustration, and not for purposes of limitation, the following dimensions are provided. The deflector 300 shown is formed of 5052 sheet aluminum 0.050 inches thick. Other embodiments use other metals and configurations. For example, the deflector could be cast. Additional embodiments use various numbers of deflector vanes 302, or even a single continuous vane. The embodiment shown has an open inner diameter 304 of 66.68 mm. The cylindrical portion 306 of the deflector 300 is 20.0 mm long, and each vane 302 is 12.7 mm long. Notches 308 extend 2.540 mm into the cylindrical portion 306 between the vanes. The embodiment shown in FIGS. 3-5 uses eight vanes 302, each 25° wide and separated by a 20° gap. Each vane is bent 60° away from the central axis of the deflector.

Figure 6:
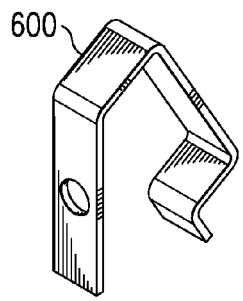
FIG. 6 is a perspective view of a clip used to hold the air deflector of FIG. 3 in place in a lamp reflector.
Figure 7:
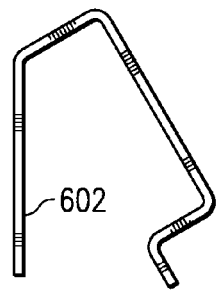
FIG. 7 is a side view of the clip of FIG. 6 used to hold the air deflector of FIG. 3 in place in a lamp reflector.
Figure 8:
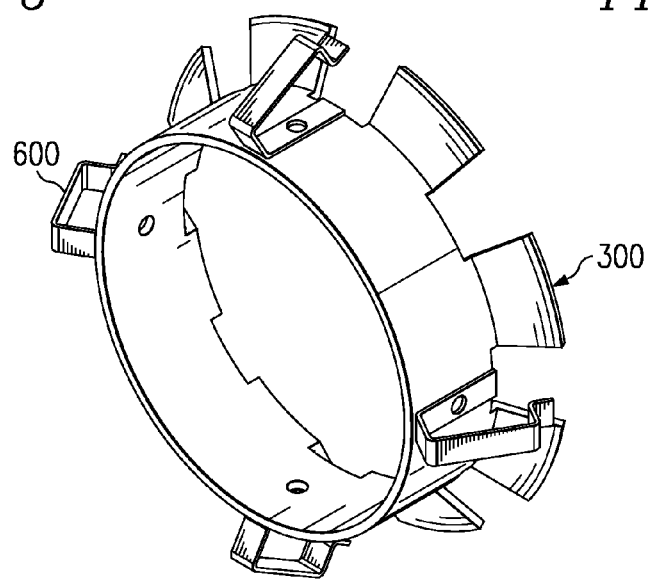
FIG. 8 is a perspective view of the deflector of FIG. 3 from the rear side showing the location of four of the clips of FIG. 7.

Clips 600 shown in FIGS. 6 and 7 are used in one embodiment to attach the deflector to the reflector. The clips 600 are formed of half-hard stainless steel, 0.025 inches thick. As discussed above, the materials, and dimensions given herein are for purposes of example and should not be considered limitations of the inventions described herein. The clips 600 may be formed from a strip of stainless steel 6.4 mm wide. The segment 602 of the clip 600 attached to the deflector is 15.88 mm long. A 120° bend is formed, followed by a 6.5 mm segment. A 90° bend is formed in the clip, followed by a 16.10 mm segment. Two more 90° bend precede the last two segments which are 4.76 mm and 3.18 mm long. A 3.25 mm hole is used to attach the clip to the deflector. The clips may be held in place using a variety of means, including #4 machine screws with lock washers and nuts, and ⅛ inch diameter aluminum rivets with a grip length of at least 2 mm. The manufactured head of the rivets is located on the inside of the deflector ring. FIG. 8 shows the assembled air deflector 300 with four clips 600 installed.

Alternate embodiments permanently fix the deflector to the reflector, or attach the deflector to the lamp. Although it is possible to attach the deflector directly to the lamp, the extreme temperatures reached by the lamp, and the concern of electrical contact between the deflector and the lamp, make it advantageous to attach the deflector to the reflector and to avoid contact with the lamp.

Figure 9:
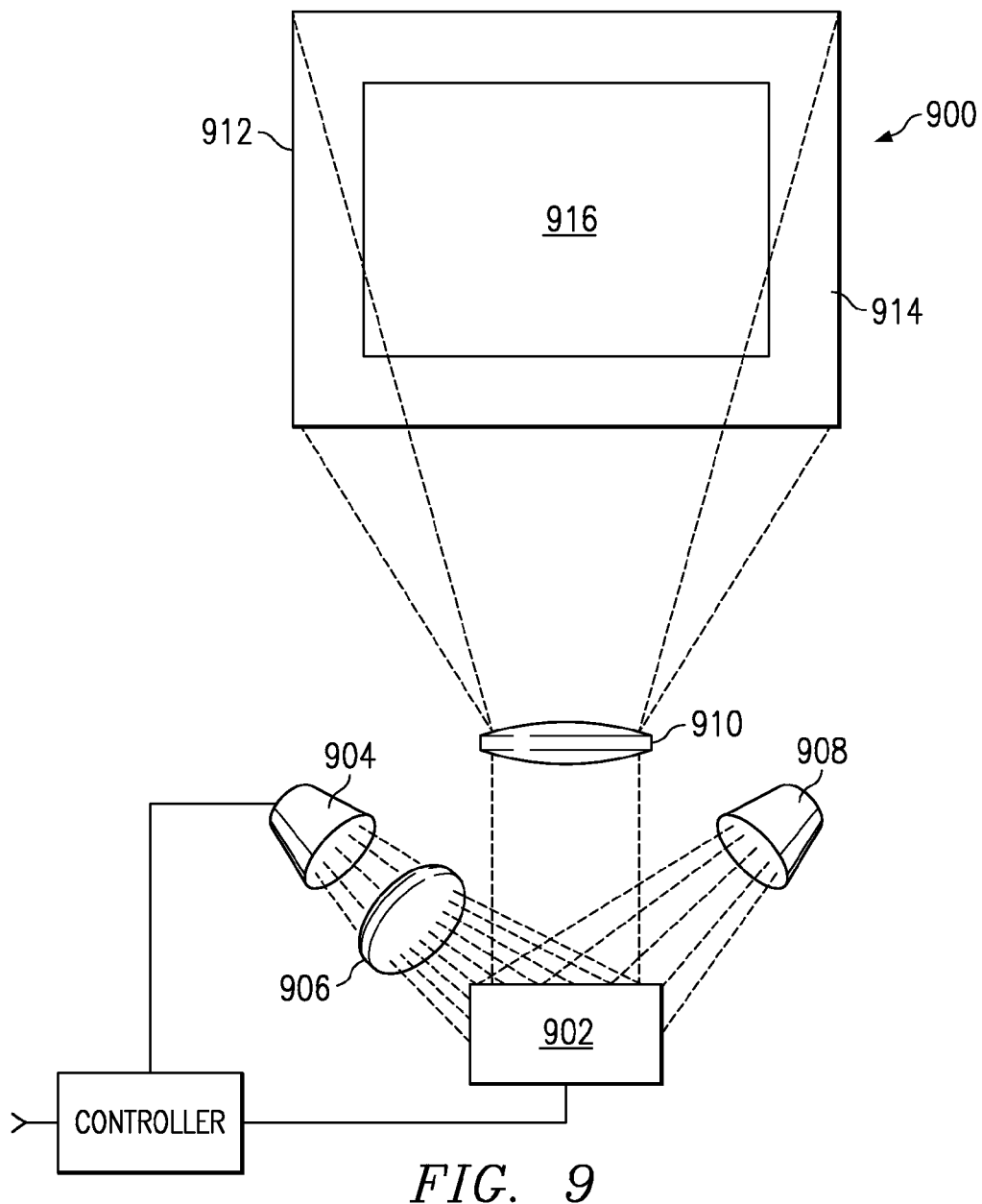
FIG. 9 is a schematic view of a digital projection system utilizing an air deflector according to one embodiment of the present invention.

FIG. 9 is a schematic view of an image projection system 900 using an air deflector according to the present invention. In FIG. 9, light from light source 904 is focused on a micromirror 902 by lens 906. The light source is comprised of an arc lamp inside a reflector, with an air deflector installed in the reflector. Although shown as a single lens and micromirror, lens 906 is typically a group of lenses and prisms which together focus and direct light from the light source 904 onto the surface of one or more micromirror devices 902. Image data and control signals from controller cause some mirrors to rotate to an on position and others to rotate to an off position. Mirrors on the micromirror device that are rotated to an off position reflect light to a light trap 908 while mirrors rotated to an on position reflect light to projection lens 910, which is shown as a single lens for simplicity. Projection lens 910 focuses the light modulated by the micromirror device 902 onto an image plane or screen 912.

Thus, although there has been disclosed to this point a particular embodiment for an air deflector and method for cooling a lamp reflector, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of cooling a lamp reflector comprising:
   providing a lamp reflector having a first reflective side defining an inner volume and focusing light from a lamp bulb, a second outer side, and a passage portion connecting said outer side to said reflective side;
   providing said lamp bulb in said lamp reflector, said bulb extending through said passage; and
   providing an air deflector between said lamp reflector and said lamp bulb, said air deflector allowing a portion of air entering said hole to cool said lamp bulb, and deflecting another portion of air entering said hole to cool said reflective surface, said deflecting performed by a portion of said air deflector located in said inner volume.

2. The method of claim 1, said providing an air deflector comprising providing an air deflector having a plurality of vanes to deflect said another portion of air.

3. The method of claim 1, said providing an air deflector comprising clipping an air deflector into said hole in said reflector.

4. A lamp reflector assembly comprising:
   a lamp reflector;
   a lamp bulb in said lamp reflector, said bulb extending through a hole in said reflector; and
   an air deflector between said lamp reflector and said lamp bulb, said air deflector allowing a portion of air entering said hole to cool said lamp bulb, and deflecting another portion of air entering said hole to cool an inner surface of said reflector said air deflector comprising a plurality of vanes to deflect said another portion of air.

5. The lamp reflector assembly of claim 4, said air deflector comprising clips for holding said air deflector in said hole in said reflector.

6. An air deflector for use in cooling a lamp reflector, comprising:
   a central cylindrical body portion, an opening in said central cylindrical body portion providing clearance for air to pass through said body and around a lamp extending through said body; and
   at least one vane portion extending from one end of said body portion, said vane portion operable to deflect a portion of air entering said hole to cool an inner surface of said reflector.

7. The air deflector of claim 6 comprising:
   clips for mounting and holding said air deflector in a hole in said reflector.

* * * * *